March 21, 1933.  L. W. BROOKS  1,902,686
SHOE HEEL
Filed Dec. 5, 1931
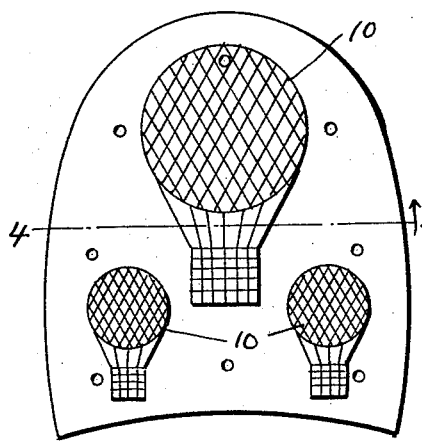
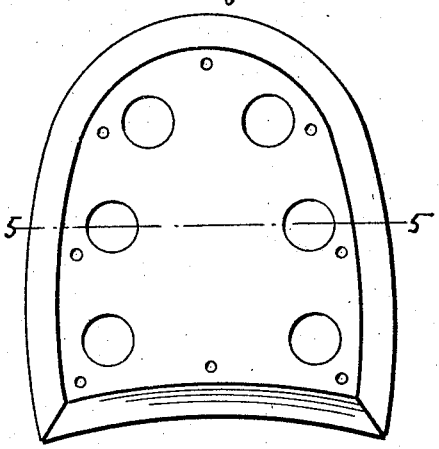
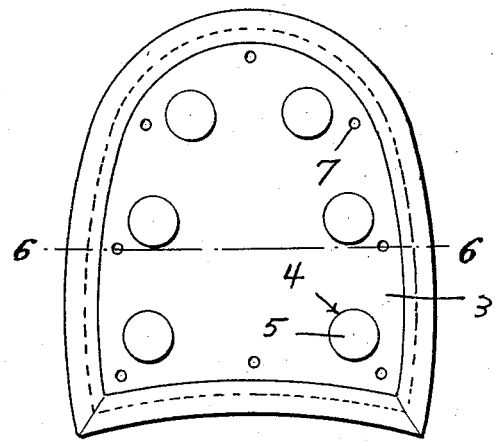
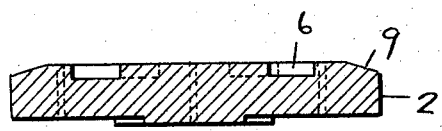
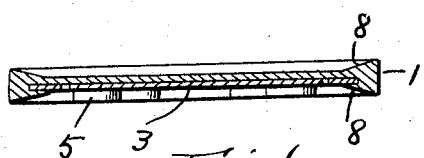
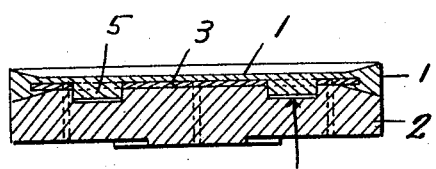
Inventor
Linzy W. Brooks
By Clarence A. O'Brien,
Attorney Patented Mar. 21, 1933

1,902,686

UNITED STATES PATENT OFFICE

LINZY W. BROOKS, OF PORTLAND, OREGON, ASSIGNOR OF ONE-THIRD TO HOWARD P. ARNEST, OF PORTLAND, OREGON

SHOE HEEL

Application filed December 5, 1931. Serial No. 579,291.

This invention relates to a heel for shoes, the general object of the invention being to provide a heel with a thin but hard base part of rubber having a metal plate therein to hold nails which will thereby be at least one-eighth inch closer to the base of the heel than has heretofore been possible and thereby giving at least one-eighth inch more wearing surface to tread of heel, with a tread part of live, softer and more elastic rubber or composition which will make a more durable and longer wearing heel with at least one-eighth inch more wearing surface before exposing metal parts; with means for so connecting the heel to the shoe as to eliminate the present method of moulding metal washers in the rubber structure; to provide a thicker structure for wear before exposing metal parts and generally to enable the use of softer, spongy, live and/or more elastic structure for the tread of the heel, and also to make possible the elimination of openings in the tread or ground engaging surface of the heel and obviating the opportunity for accumulating dirt and other foreign matter.

This invention also consists in certain other features of construction and in the combination and arrangement of the several parts to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:—

Figure 1 is a bottom face view of the improved heel.

Fig. 2 is a top plan view of the tread member.

Fig. 3 is a bottom plan view of the base or seat member.

Fig. 4 is a section on line 4—4 of Fig. 1.

Fig. 5 is a section on line 5—5 of Fig. 2.

Fig. 6 is a section on line 6—6 of Fig. 3.

In the drawing, the numeral 1 indicates the base member formed of hard rubber or a composition thereof, and the numeral 2 indicates the tread member which is formed of softer or more elastic rubber or composition thereof. A metal plate 3 is partially inserted in the base part 1 and is of less dimension than said part and is formed with the openings 4 through which extends the projections 5 on the member 1, and the tread member 2 is formed with the recesses 6 in its top face for receiving the projections 5.

The plate 3 is also formed with small perforations 7 for receiving small nails, pegs or the like which also pass through the tread member 2 and the base member 1 into the shoe to fasten the heel to the shoe. As will be seen, the nails can be driven into the heel far enough to permit the ground engaging surface of the heel to close over their lower ends so that the nails will not be exposed and will not contact the surface until the heel has worn to a considerable extent, and by providing the metal plate through which the nails pass the depression usually formed in heels of this type are eliminated, consequently removing lodging places for dirt and other foreign matter, and also enables the use of softer and consequently more elastic and more durable rubber for the top or exposed part of the heel than has heretofore been possible; and through the lack of necessity for use of metal washers, as heretofore used, makes possible the use of a grade of rubber which otherwise could not be used because of its spongy character and thereby provides not only an easy, balloon-like tread but assures longer life in the material itself, and enables the use of rubber of the highest quality.

As will be seen from Figs. 3 and 6, the outer edges of the seat or base part 1 are raised and sloped towards the center as shown at 8 and the top part of the tread portion 2 slopes downwardly and outwardly at its edges as shown at 9 to fit the beveled part 8 on the under face of the base or seat part 1. These beveled portions 8 and 9 act to keep the more elastic and softer and durable rubber of which the tread 1 is made from bellowing out at the joint and the hard rubber projections 5 engaging the recesses 6 prevents slipping or bellowing of the soft rubber of which the tread is made.

As I prefer to call my improved type of heel a "balloon heel", I form raised portions 10 on the bottom face of the tread part thereof to represent balloons as shown in Fig. 1.

This heel can be manufactured by molding the tread of the heel to heel-seat or by molding both parts separately and cementing the parts together. The right is reserved to mold the tread and heel seat separately, coating both parts with adhesive material and covering the adhesive surface with the cloth; the cloth to be removed at the time of joining heel seat and tread together.

By this combination and production of a rubber heel, the present expensive burden of molding washers within the rubber heel to hold nails is removed and opportunity provided to make the outer or exposed portion of the heel, of a spongy, live and consequently much more durable and comfortable material. The holes through the tread will be practically invisible on account of the soft durable rubber or material of which the tread may be made. This provides an easy, balloon-like tread and at the same time assures longer life in the material itself.

The balloon heel will be to the shoe industry what the balloon tire is to the automobile industry, and the wearer of shoes will be assured of more cushions under the foot, more comfort and more wear with a spring-like reaction in the heel of a shoe more nearly like that provided by nature in the heel itself.

Thus it will be possible to make a heel whether full or partial that will be attractive to the shoe manufacturer so the base or heel seat may be moulded of extremely hard rubber or composition, nearly brittle, which will enable it to take a high luster when polished; an enormous saving in material and labor may be accomplished by thus eliminating the leather seat that is now in universal use.

The heel may be manufactured by moulding first a hard rubber base or heel seat cooked sufficiently to retain its shape and design. The top part of the mould will then be removed leaving the seat or base in the mould; a perforated metal plate is then placed in the heel seat; next is added sufficient and desired material to complete the required height of the base or heel seat, except for a final layer of soft, elastic material of the highest quality possible to obtain in rubber; the top of the mould, carrying a design of two small balloons placed respectively on the outer left and right of the heel with the words "Super Spring Balloon" triangularly placed across the heel, is then put in place and the contents sufficiently cooked to make the complete heel.

It is desired to have the heel carry upon it when completed two balloons with the word "Super Spring Balloon" at an angle across the heel at the left and right so as to indicate which shoe the particular heel is for.

It is thought from the foregoing description that the advantages and novel features of the invention will be readily apparent.

It is to be understood that changes may be made in the construction and in the combination and arrangement of the several parts provided that such changes fall within the scope of the appended claims.

Having thus described my invention, what I claim as new is:—

1. A heel of the class described comprising a base formed of hard rubber and a tread part formed of softer and more elastic rubber and a metal plate partly inserted in the base part and having its lower face partly contacting the upper face of the tread part, said plate having holes therein for receiving fastening means for connecting the heel to the heel part of the shoe.

2. A heel of the class described comprising a base formed of hard rubber and a tread part formed of softer and more elastic rubber, a metal plate partly inserted in the base and having openings therein, projections formed on the base and extending through said openings and the tread part having recesses therein for receiving the projections, said plate also having holes therein for receiving fastening means which connect the heel to the heel part of the shoe.

3. A heel of the class described comprising a base formed of hard rubber and a tread part formed of soft and more elastic rubber, a metal plate partly inserted in the base and having openings therein, projections formed on the base and extending through said openings and the tread part having recesses therein for receiving the projections, said plate also having holes therein for receiving the fastening means which connect the heel to the heel part of the shoe, said base part having inwardly beveled edges and the tread part having outwardly and downwardly beveled edges for engaging the beveled edges of the base part.

4. A composite heel having a relatively thin hard rubber base member, a relatively thick soft rubber tread member, said base member having a flaring, thickened peripheral edge portion, and a reenforcing plate between said base and tread members having its peripheral edge embedded in the thickened edge of the base member.

5. A composite rubber heel, including a thin, hard rubber base member, a reenforcing plate apertured to receive heel attaching nails and having its peripheral edge embedded in the edge portion of the base member, and a relatively thick, soft rubber tread member secured to the plate and to the portions of the base member around the plate.

In testimony whereof I affix my signature.

LINZY W. BROOKS.